United States Patent

[11] 3,566,904

[72] Inventor Harold S. Davis
Richland, Wash.
[21] Appl. No. 816,236
[22] Filed Apr. 15, 1969
[45] Patented Mar. 2, 1971
[73] Assignee the United States of America as represented by the United States Atomic Energy Commission

[54] LIQUID FLOW CONTROL SYSTEM
7 Claims, 4 Drawing Figs.
[52] U.S. Cl. ................................................ 137/206,
137/403, 137/602
[51] Int. Cl. ................................................ F17b 1/14
[50] Field of Search .......................................... 137/209,
206, 137, 138, 593, 403, 453, 602

[56] References Cited
UNITED STATES PATENTS
636,610 11/1899 Adams ........................ 137/137

Primary Examiner—Alan Cohan
Attorney—Roland A. Anderson

ABSTRACT: A liquid flow control system which provides for the instant and automatic substitution of an emergency supply of liquid for a normal supply of liquid when the normal supply is inadequate, while preventing the two liquids from mixing during normal operation. The two supplies of liquid are connected by an inverted U-tube extending above the highest level the normal supply can reach. An air pocket at the top of the inverted U-tube prevents mixing of the two liquids in normal operation. When the normal supply is exhausted, the air pocket is vented to the atmosphere, causing the emergency supply to flow through the U-tube supplementing the normal supply.

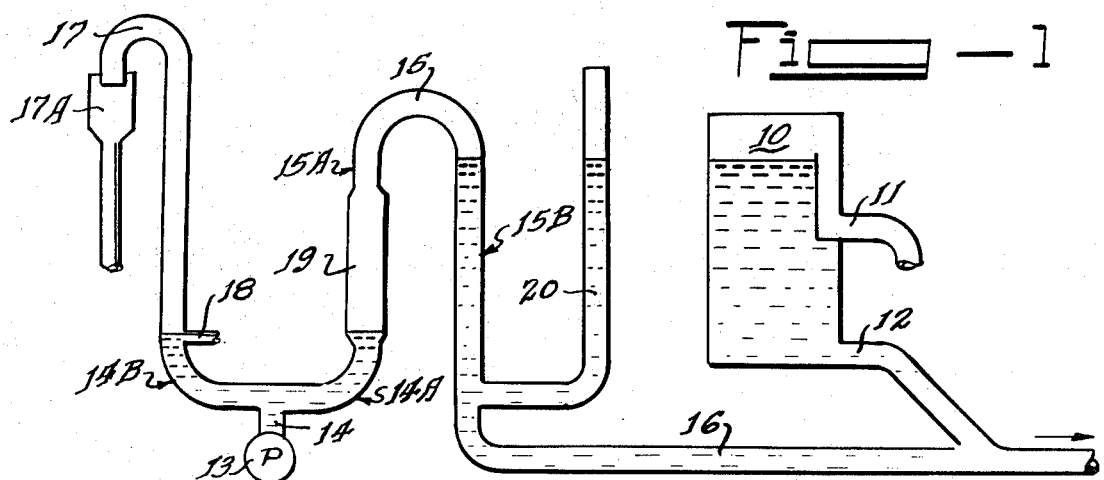
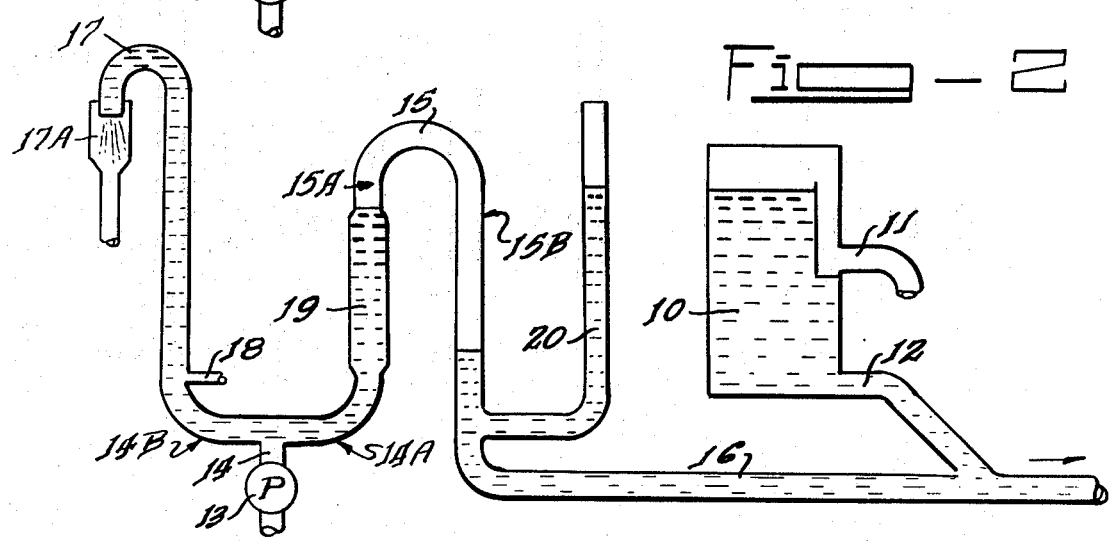
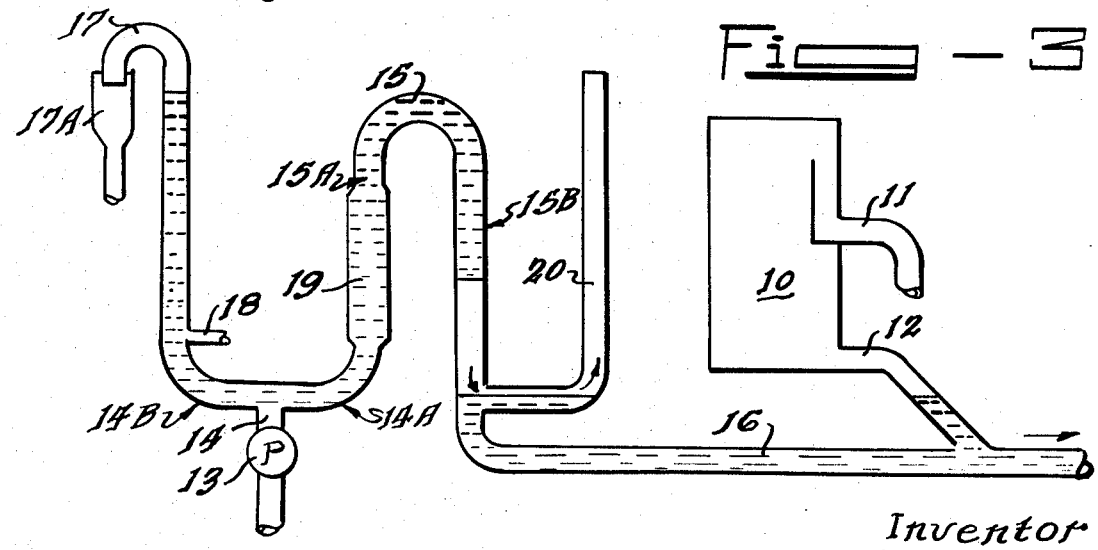

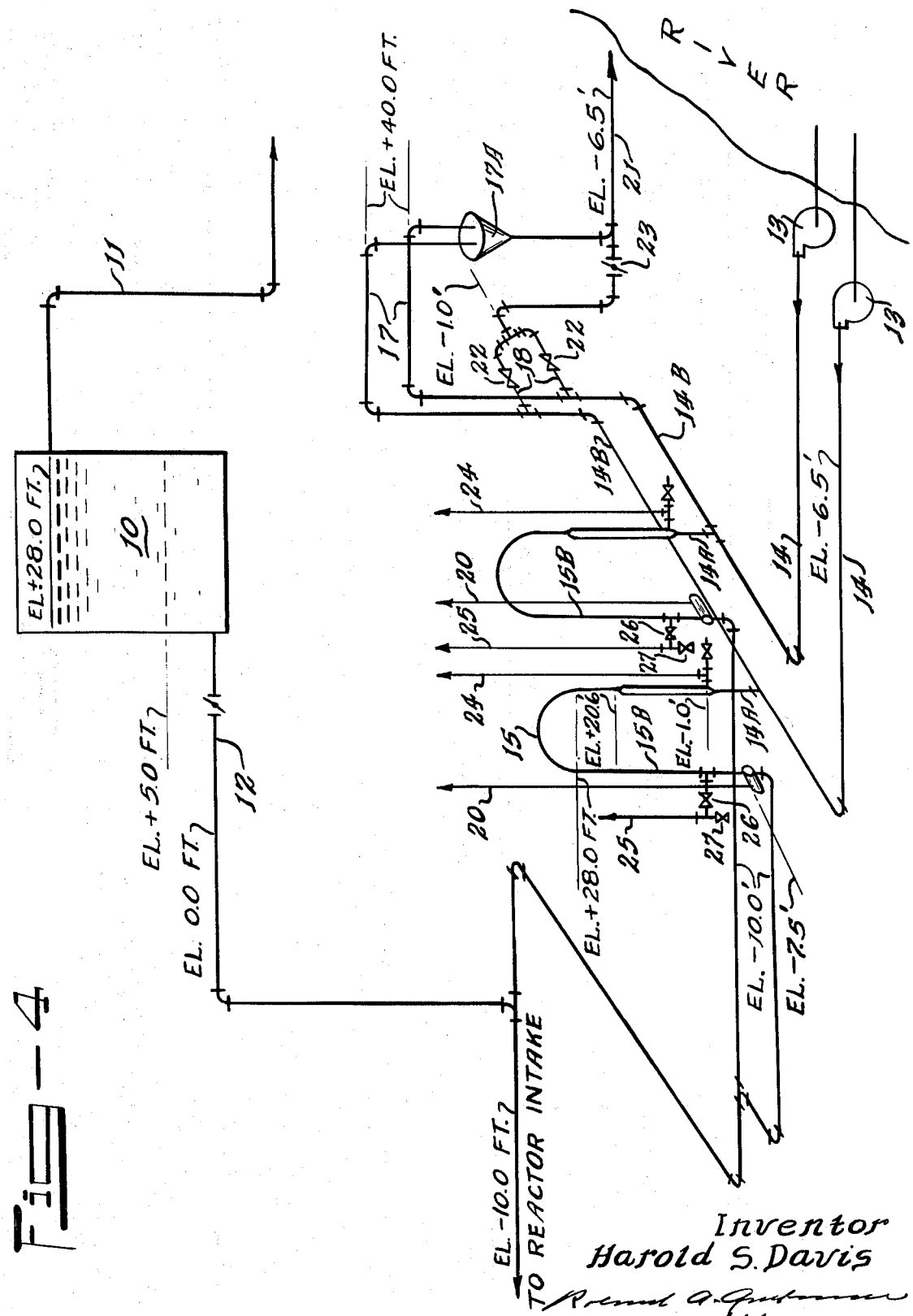

3,566,904

LIQUID FLOW CONTROL SYSTEM

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

This invention relates to a liquid flow control system. In more detail, the invention relates to a liquid flow control system having no moving parts. In still more detail, the invention relates to a liquid flow control system which provides for the instant and automatic substitution of an emergency supply of liquid for a normal supply of liquid when the normal supply of liquid is inadequate. In even more detail, the invention relates to a liquid flow control system which supplies untreated cooling water to a nuclear reactor when the supply of treated water is inadequate while preventing mixing of treated and untreated water during normal operation of the reactor.

It is frequently necessary to provide an auxiliary supply of liquid which is available for use when the normal supply of liquid is inadequate or exhausted. Unless the two liquids are identical in composition, it may be necessary to prevent mixing of the liquids during normal operation. Such a system can be used, for example, in any situation where treated water is normally used and a supply of raw water is available for emergency use. It may also be used when heated water is normally used and cold water is available as a backup supply or when clean water is normally used and the backup supply is or may be dirty or contaminated. It also, of course, applies to the use of liquids other than water in similar situations.

Conventional valves or gates are, of course, available for this purpose. It is, however, desirable in some situations to provide a liquid flow control system for this purpose which has no moving parts. One situation in which such a system is desirable is in a plant incorporating a pressurized-water-cooled nuclear reactor. Such a reactor is normally cooled by demineralized water maintained within a closed circuit. It is necessary, however, to have a supply of raw water instantly available in case there is a failure in the supply of demineralized water. Obviously, any system used must prevent the admission of raw water to the reactor cooling system under normal conditions of operation, but the raw water must be available instantly and automatically when it is needed.

BRIEF DESCRIPTION OF THE DRAWINGS

The invention will next be described in connection with the accompanying drawings wherein:

FIGS. 1, 2 and 3 are diagrammatic views of a liquid flow control system according to the present invention wherein FIG. 1 shows the system in the normal operating condition, FIG. 2 shows the system as it appears when being primed, and FIG. 3 shows the system in the emergency operating condition; and FIG. 4 is a flow sheet illustrating application of the flow control system according to the present invention to a system for supplying auxiliary cooling water to a nuclear reactor.

Referring now to FIGS. 1—3 of the drawing, a large tank 10 having an overflow line 11 located near the top of the tank and an outlet line 12 located near the bottom of the tank contains a supply of a liquid being utilized in a system forming no part of the present invention. If the demand for this liquid exceeds that normally provided, the supply of liquid in tank 10 is used. If a real emergency exists and the demand continues till the supply of liquid in tank 10 is exhausted, the flow control system according to the present invention provides for the instant and automatic substitution of an emergency supply of a different liquid for that in ordinary use.

This liquid is supplied to the system by a pump 13 provided with an outlet line 14 having branches 14A and 14B. Branch 14A feeds liquid into inverted U-tube 15 from pump 13 with pipe 16 leading the liquid from U-tube 15 past an intersection with line 12 to the system in which the liquid is to be utilized. Inverted U-tube 15 includes a riser leg 15A to which pump 13 delivers the emergency supply of liquid and a downcomer leg 15B delivering the liquid to pipe 16. The top of U-tube 15 is above the liquid level in tank 10. Branch 14B of outlet line 14 leads liquid from pump 13 to an overflow line 17 which also extends above the liquid level in tank 10 and discharges the liquid into an open receiver 17A. A drain pipe 18 having a restricted outlet communicates with branch 14B at a level substantially below the top of the line. Riser leg 15A of U-tube 15 is enlarged in cross section at 19 to provide the proper hydraulic balance in the system, while a vent pipe 20 communicates with downcomer leg 15B below the bottom of tank 10, vent pipe 20 extending above the top of tank 10.

With tank 10 filled to the overflow with an auxiliary supply of the liquid being utilized, the flow control system is charged with the liquid for emergency use by introducing it into the system with pump 13 until the liquid overflows through line 17. It will be observed that liquid from tank 10 also fills downcomer leg 15B and vent pipe 20 by virtue of the connection between U-tube 15 and tank 10. Emergency liquid fills riser leg 15A of inverted U-tube 15 to a level established by the height to which overflow line 17 extends. It is unable to flow over the top of the U-tube due to the formation of an air pocket at the top of the U-tube. This situation is depicted in FIG. 2 of the drawing. The height to which overflow line 17 extends is not critical due to the great volume of liquid in tank 10.

Under normal conditions, pump 13 is not operating and emergency liquid drains through pipe 18 to establish the liquid level, as shown in FIG. 1. If the demand for liquid in the system utilizing this liquid exceeds that available in the system, the liquid in tank 10 is used. If a real emergency exists and this auxiliary supply is insufficient, the level of liquid in tank 10 falls and with it the level of liquid in downcomer leg 15B of the U-tube. When the liquid level in downcomer leg 15B falls to the level of the inlet to the vent pipe 20, the air pocket is vented to the atmosphere and liquid flows over the top of the U-tube. Meanwhile, the pump 13 will be started automatically by conventional controls and an emergency supply of liquid will flow through pipe 16 to the system in which it is to be utilized. This situation is shown in FIG. 3.

Pump 13 can, of course, be eliminated by providing an emergency supply of liquid at an elevation such that it will flow over U-tube 15 by gravity in the absence of the air pocket at the top of U-tube 15.

A specific embodiment of the invention in which the flow control system of the present invention provides emergency coolant to a pressurized-water reactor is shown in FIG. 4. To avoid difficulties in the coolant system of such a reactor, demineralized water in closed cycle is ordinarily employed. Under some circumstances an auxiliary supply of coolant is needed; for example, on startup or shutdown of the reactor. For this purpose tank 10 is filled to a depth of 28 feet with 200,000 gallons of heated demineralized water. Availability of this auxiliary supply of demineralized water will frequently make unnecessary cleanup of the cooling system of the reactor as is required every time raw water is admitted thereto. In some emergency conditions this auxiliary supply of water may be insufficient and the flow control system according to the present invention will than operate to provide untreated water from a natural body of water, such as a river, to cool the reactor. With tank 10 filled with hot demineralized water, the system is primed by introducing raw river water into dual systems with two pumps 13. Raw water flows through overflow lines 17 at an elevation of 40 feet with respect to the bottom of tank 10 and is returned to the river through line 21 at an elevation of −6.5 feet. Raw water is prevented from flowing over the top of U-tubes 15 by the air pockets existing therein. The top of the U-tubes is slightly above the water level in tank 10 when this tank is filled with water. When the pumps 13 are not operating during normal operation of the reactor, drainpipes 18 will maintain the raw water level in the system at the minus 1-foot level. Drainpipes 18 are provided with hydraulically actuated valves 22 which close when water in tank 10 drops below the 5-foot level. The purpose of these valves is to conserve raw water. Drainpipes 18 unite to form a single pipe which is provided with a check valve 23 near the point the pipe dumps into raw water return line 21 to prevent water, which might be present in the raw water return line, from backing up in the flow control system. Vent lines 24 assure that the air pressure in the air pocket in inverted U-tubes 15 is atmospheric when pumps 13 are not operating. As should now be apparent, whenever the level of water in tank 10 drops sufficiently to permit the air pocket in the inverted U-tubes 15 to be vented to the atmosphere through lines 20, the existing head of raw water in the system forces raw water over the top of the inverted U-tube. In the system as described, this level is 5 feet.

Any accident which might cause a loss of the entrapped air pocket, such as a hole in the top of the U-tube, will cause raw water to fill the U-tube and flow through line 16. Thus the system is extremely reliable and fail-safe, since its operation depends only on available pressure heads to separate flow during normal operating conditions and to prime the system and supply raw water to the reactor in an emergency.

Although the flow control system as described is passive and automatic in behavior, there may be times when it should be activated before the water level in tank 10 drops to the 5-foot mark. This can be accomplished by providing a seal pipe 25 communicating with downcomer leg 15B at a level below that reached by the demineralized water when pumps 13 are on. A valve 26 between seal pipe 25 and leg 15B makes it possible to fill seal pipe 15 with demineralized water from the U-tube and valve 27 at the base of the seal pipe makes it possible to drain this water from the seal pipe. Conventional electrical circuitry can be used to open first valve 27 and then valve 26, draining the water from the seal pipe and some of the water from the downcomer leg of the U-tube, thereby venting the air pocket to the atmosphere and triggering the flow of raw water through line 16. As shown, this can be accomplished only when the tank 10 contains more than 10 feet and less than about 20 feet of water. It will be noted that a tap into leg 15B at a higher elevation would make it possible to trigger the system at any time. However, any such provision will necessitate a leaktight arrangement at the penetration; otherwise, a small amount of leakage over a modest period of time could prime the system inadvertently.

It can readily be shown that in a system as described with a 42-inch diameter raw-water leg 15A and a 30-inch diameter demineralized-water leg 15B, the system will be triggered as the tank 10 approaches emptiness and the system cannot be triggered by the operation of pumps 13 alone. Of course, variation of the specific parameters described is possible while remaining within the scope of the present invention.

It will be understood that the invention is not to be limited to the details given herein but that it may be modified within the scope of the appended claims.

I claim:

1. A liquid flow control system which provides for the automatic substitution of a supply of an emergency liquid for a supply of a different liquid in normal use when the normal supply is depleted comprising a tank filled with the liquid in normal use, an inverted U-tube extending above the top of the tank of which one leg communicates with the tank and the other leg communicates with a source for the emergency liquid, said source including a pump having a branching outlet pipe, one branch communicating with the said other leg of the inverted U-tube and the other branch communicating with an overflow pipe extending above the top of the tank, said source being under sufficient pressure to force liquid over the top of the U-tube in the absence of an air pocket in the top of the U-tube and under insufficient pressure to force liquid over the top of the U-tube in the presence of an air pocket in the top of the U-tube, whereby said first-named leg is filled with liquid from the tank and the other leg is filled with the emergency liquid and an air bubble separates these different liquids, and means for venting the air pocket to the atmosphere when the supply of liquid in the tank is depleted, whereby the emergency liquid flows over the top of the inverted U-tube to replace the normal supply of liquid in use.

2. A liquid flow control system according to claim 1 and including an outlet in said overflow pipe having a cross section much smaller than that of the overflow pipe at an elevation below the bottom of the tank.

3. A liquid flow control system according to claim 2 wherein said means for venting the air pocket to the atmosphere comprises a vent pipe communicating with the leg of the inverted U-tube communicating with the tank at an elevation below the bottom of the tank.

4. A liquid flow control system according to claim 3 wherein said tank has an overflow at the top of the tank and an outflow pipe near the bottom of the tank, the said first-named leg of the inverted U-tube communicating with the said outflow pipe.

5. A liquid flow control system according to claim 4 and including a vent line communicating with the said other leg of the U-tube to assure that the air pressure in the air pocket is atmospheric when the pump is not working.

6. A liquid flow control system according to claim 5 and including means for activating the control system manually including a seal pipe communicating with the leg of the U-tube communicating with the tank at an elevation above the bottom of the tank, said seal pipe being provided with a valve between the seal pipe and the U-tube leg and a drain including a valve at the bottom thereof.

7. A liquid flow control system according to claim 6 wherein the tank contains 200,000 gallons of distilled water for use in a nuclear reactor and the emergency supply of liquid is river water.